United States Patent [19]

Maurer et al.

[11] 4,346,065

[45] Aug. 24, 1982

[54] PROCESS FOR THE MANUFACTURE OF FINELY DISPERSED SPARINGLY SOLUBLE SALTS OF OXYACIDS OF PHOSPHORUS

[75] Inventors: Alexander Maurer; Renate Adrian, both of Hürth; Gero Heymer, Erftstadt-Liblar, all of Fed. Rep. of Germany

[73] Assignee: Hoechst Aktiengesellschaft, Fed. Rep. of Germany

[21] Appl. No.: 222,079

[22] Filed: Jan. 2, 1981

[30] Foreign Application Priority Data

Dec. 19, 1979 [DE] Fed. Rep. of Germany ....... 2951126

[51] Int. Cl.$^3$ ...................... C01B 15/16; C01B 25/26; C04B 11/22
[52] U.S. Cl. .................................... 423/305; 423/307; 423/314; 423/315; 106/14.12
[58] Field of Search ............... 423/304, 305, 306, 307, 423/308, 314, 315; 106/14.12

[56] References Cited

U.S. PATENT DOCUMENTS 3,141,732  7/1964  McCullough et al. ............. 423/306

FOREIGN PATENT DOCUMENTS 2655458  6/1977  Fed. Rep. of Germany .
2840820  3/1980  Fed. Rep. of Germany ...... 423/305

Primary Examiner—O. R. Vertiz
Assistant Examiner—Gregory A. Heller
Attorney, Agent, or Firm—Connolly and Hutz

[57] ABSTRACT

The invention relates to a process for making a finely dispersed, sparingly soluble salt of an oxyacid of phosphorus, having a maximum particle size of 20 μm, by reacting a compound of a divalent metal with the oxyacid of phosphorus or an alkali metal or ammonium salt thereof. More particularly, finely dispersed salt consisting to an extent of at least 90% of particles with a size between 0.05 and 7 μm is made. To this end, an at least 5% by weight aqueous solution or suspension of a compound of a divalent metal selected from the group Mg, Ca, Sr, Ba, Mn, Zn, Cu, Cd, Pb, Sn, Co and Ni is reacted, while maintaining a pH range of between 3 and 9 and while stirring, with an at least 2 mol % solution of at least one trivalent metal selected from the group Al, Fe and Cr in the oxyacid of phosphorus and, optionally, with an aqueous solution of an alkali metal or ammonium salt of the oxyacid of phosphorus, and the precipitated salt is separated off and dried.

7 Claims, No Drawings

PROCESS FOR THE MANUFACTURE OF FINELY DISPERSED SPARINGLY SOLUBLE SALTS OF OXYACIDS OF PHOSPHORUS

The invention relates to a process for the manufacture of a finely dispersed, sparingly soluble salt of an oxyacid of phosphorus, having a maximum particle size of 20 μm, by reacting a compound of a divalent metal with the oxyacid of phosphorus or an alkali metal or ammonium salt thereof, which comprises reacting an at least 5% by weight aqueous solution or suspension of a compound of a divalent metal selected from the group Mg, Ca, Sr, Ba, Mn, Zn, Cu, Cd, Pb, Sn, Co and Ni, while maintaining a pH-range of between 3 and 9 and while stirring, with an at least 2 mol% solution of at least one trivalent metal selected from the group Al, Fe and Cr in the oxyacid of phosphorus, and, optionally, with an aqueous solution of an alkali metal or ammonium salt of the oxyacid of phosphorus, with the resultant formation of finely dispersed salt consisting to an extent of at least 90% of particles with a size between 0.05 and 7 μm, and separating off and drying the precipitated salt in known manner.

Further preferred features of the present process provide:

(a) for a carbonate, oxide, acetate or hydroxide to be used as a compound of a divalent metal;

(b) for the aqueous solution or suspension of the compound of the divalent metal to be prepared first and for it to be admixed with agitation, with metered proportions of the solution of the trivalent metal in the oxyacid of phosphorus;

(c) for the pH-range to be maintained between 3 and 9 by simultaneously adding an alkaline compound which forms a water-soluble salt with the acid-reacting anion, in the event of the compound of the divalent metal having an acid-reacting anion;

(d) for an aqueous solution of an alkali metal or ammonium salt of the oxyacid of phosphorus to be prepared first and used as the alkaline compound and for it to be admixed with metered proportions of a mixture of an aqueous solution of the compound of the divalent metal and the solution of the trivalent metal in the free oxyacid of phosphorus, the stoichiometrically required amount of free oxyacid of phosphorus to be used being reduced by an amount equivalent to that of the alkali metal or ammonium salt first prepared;

(e) for an 8-30% by weight aqueous solution or suspension of a compound of the divalent metal to be used;

(f) for the compound of the divalent metal and that of the trivalent metal to be used in the reaction mixture in a molar ratio of from 9:1 to 50:1;

(g) for the reaction components to be reacted by intimately mixing them in a dispersing vessel rotating at a speed of from 3000 to 10 000 rev/min. with the resultant formation of finely dispersed salt consisting to an extent of at least 90% of particles with a size between 0.05 and 2 μm.

The finely dispersed, sparingly soluble salts so produced are used preferably as anti-corrosion pigments. These pigments may, however, also be incorporated into lacquers, dispersions and plastics materials which need not possess anticorrosive properties. Their use in various types of glass is also envisaged since the finely dispersed pigments produce a homogeneous distribution more rapidly. Finally, it is possible for some of the salts of this invention to be used in foodstuffs and animal feed and also in the cosmetics and pharmaceutical industry, for example in toothpastes. This is advantageous especially in those cases in which finely particulate products are desirable.

Phosphorus-containing pigments are becoming increasingly important especially in corrosion protection because, in addition to their being highly effective, they generally compare favorably with commercially available products under toxicological aspects. To be highly effective the pigments must have a sufficient fineness which is achieved either by cumbersome milling of the phosphates or by reaction under strongly dispersing conditions as described, for example, in prior German Patent Application P 28 40 820.0. This method actually permits the production of pigment particles having particle sizes of less than 20 μm, but the high-speed milling and dispersing apparatus are very expensive with regard to energy consumption and very susceptible to wear, so that it is highly desirable to improve the production methods.

DE-OS 26 55 458 describes a process for the manufacture of phosphate pigments wherein an aqueous solution containing zinc and phosphate ions is reacted with an iron material, with the resultant formation of a precipitate of zinc phosphate and iron phosphate. Although the solid particles exhibit pigment fineness, the product can be used as pigment only after subsequent treatment with an alkaline earth metal hydroxide because its water-soluble content would otherwise be too high. This requires additional apparatus and materials to be used. Also, in contrast to the present invention, instead of reacting a compound of divalent metals with a phosphoric acid that contains the trivalent metal, a very dilute aqueous solution of $Zn(H_2PO_4)_2$ is brought together with an iron material, which results in the formation of a mixture of zinc phosphates and iron phosphates. Accordingly, it is not a phosphorus-containing pigment of a single divalent metal of improved dispersivity that results but, at best, a mixture of various iron and zinc phosphates in pigment fineness.

In contrast to this, it has now been found that, in precipitating phosphorus-containing pigments of divalent metals, significantly higher dispersivity can be achieved if at least 2 mol% of Al and/or Fe and/or Cr, based on the stoichiometrically required amount of metal ions, is added to the oxyacid of phosphorus used for the reaction, such as phosphoric acid ($H_3PO_4$), phosphorous acid ($H_3PO_3$) or a condensed phosphoric acid, for example, pyrophosphoric acid ($H_4P_2O_7$). The divalent metals comprise especially Mg, Ca, Sr, Ba, Mn, Zn and Pb, and also Cu, Cd, Sn, Co and Ni. The precipitation reaction should be effected within a pH-range of between 3 and 9 permitting the added trivalent metals Al, Fe or Cr to become fully active. In this manner, for example phosphates, pyrophosphates or phosphites which, as such, are precipitated in a very coarse form, can be precipitated in pigment fineness, that is to say less than 20 μm, even without the use of high-speed stirring apparatus. Needless to say, however, high-speed dispersing apparatus which operate, for example, according to the rotor-stator principle, can be used in the precipitation reaction in accordance with the present invention. In this case a still further, clear shift into the finely disperse region is observed (cf. Examples 6-9).

In this manner, the phosphates, pyrophosphates or phosphites are obtained in the form of particles with a fineness not heretofore obtainable apart from very small quantities of fine particle fractions sieved off or screened off heretofore under technically difficult and expensive conditions, for experimental use. Needless to say, this procedure is neither technically nor economically practicable.

The metal ions of aluminium iron or chromium are reacted in a preliminary stage, preferably in the form of their oxides, hydroxides or phosphates, with the oxyacid of phosphorus in the desired concentration so that no anionic impurities are introduced into the reaction mixture. In principle, however, other compounds or, if possible, the metals themselves, are suitable for reaction with phosphoric acid. Depending on the reactivity of the compounds used, the solution is prepared at room temperature or at elevated temperature, the formation of a clear solution being the only important requirement.

The solution of the metals Al and/or Fe and/or Cr in the corresponding oxyacid of phosphorus is metered into a solution or suspension of basic compounds of divalent metals (oxides, hydroxides, carbonates, acetates) under conditions that result in as homogeneous as possible a distribution in the reaction mixture. In so doing, the pH may vary within the range specified. In those cases in which acid-reacting compounds of divalent metals, for example chlorides, sulphates or nitrates, are used, it is possible for the pH-range to be maintained by the simultaneous use of alkaline compounds (for example NaOH, KOH) which, under the reaction conditions, form water-soluble salts with the anions used. In order to maintain a pH-range of 3 to 9, it is also possible for a certain proportion of phosphate, pyrophosphate or phosphite to be used in the form of an alkali metal or ammonium compound and for the balance to be added in the form of the Al- and/or Fe- and/or Cr-containing oxyacid of phosphorus jointly with the solution of the divalent metal salt (cf. Example 10). In this manner, the additives according to the invention become fully active in the reaction mixture.

The suspension or solution of compounds of the divalent metals should be used in a form which is as concentrated as possible. This is desirable for the following reasons: economies are achieved with respect to apparatus and the high concentration intensifies the action of the metals used together with the oxyacid of phosphorus, in accordance with this invention. The concentration of the suspension or solution should therefore be higher than 5% by weight; the only limiting factor with regard to the maximum concentration is the stirrability of the resulting slurry. If lower concentrations are used, only unsatisfactory effects have been found to be produced. Very dilute solutions or suspensions produce practically no effect.

The reaction mixture should be worked up by conventional methods. The products are separated in the usual form from the solution, for example by filtering, decanting or centrifuging, are washed and, depending on their sensitivity to temperature, dried with customary apparatus. It is also possible, for example, to spray-dry the reaction mixture, which obviates the previous separation of the product from the reaction mixture.

The following Examples illustrate the invention:

EXAMPLE 1

A solution of 27.0 g (1 mol) of Al in 2305 g (20 mol) of $H_3PO_4$ (85% by weight strength) was metered into a well stirred suspension of 1902 g (19 mol) of $CaCO_3$ in 20 l of water in the course of 2 hours. The solution had been prepared by dissolving the corresponding amount of $Al(OH)_3$ in boiling $H_3PO_4$. The temperature during the reaction of the calcium carbonate with the solution of Al in $H_3PO_4$ was 25° C. and the pH was between 9 and 4.5. A precipitate was obtained which was filtered off, washed with water and acetone and dried in a drying cupboard for 1 hour at 70° C. A white pigment was obtained, X-ray analysis indicated that it was calcium hydrogen phosphate dihydrate (Joint Committee on Powder Diffraction Standards, 1978 (JCPDS) card index No. 9–77 and 11-293). Its average particle size was 4 μm and the maximum particle size 10 μm. The BET surface area was 2.7 $m^2/g$.

EXAMPLE 2

The procedure was as in Example 1 except that a solution of 10.8 g (0.4 mol) of Al in 2305 g (20 mol) of $H_3PO_4$ (85% by weight) was metered into a suspension of 1962 g (19.6 mol) of $CaCO_3$ in 20 l of water. A white pigment was again obtained. It had an average particle size of 4 μm and a maximum particle size of 10 μm. The BET surface area was 2.5 $m^2/g$.

EXAMPLE 3

The procedure was as in Example 1 except that a solution of 55.85 g (1 mol) of Fe in 2305 g (20 mol) of $H_3PO_4$ (85% by weight) was metered in. A yellowish pigment was obtained; by X-ray analysis, it was identified as calcium hydrogen phosphate dihydrate. It was an average particle size of 4 μm and a maximum particle size 10 μm. The BET surface area was 2.4 $m^2/g$.

EXAMPLE 4

The procedure was as in Example 1 except that a solution of 52.0 g (1 mol) of Cr in 2305 g (20 mol) of $H_3PO_4$ (85% by weight) was metered in. The reaction product was a greenish pigment. By X-ray analysis, it was identified as calcium hydrogen phosphate dihydrate. It had an average particle size of 5 μm and a maximum particle size of 12 μm. The BET surface area was 2.4 $m^2/g$.

EXAMPLE 5 (Comparative Example)

The procedure was as in Example 1 except that 2305 g (20 mol) of 85% by weight $H_3PO_4$ was added to a suspension of 2002 g (20 mol) of $CaCO_3$ in 20 l of water. Calcium hydrogen phosphate dihydrate having an average particle size of 30 μm and a maximum particle size if 70 μm was obtained. The BET surface area was 0.3 $m^2/g$.

EXAMPLE 6

In a 30 l vessel equipped with a stirrer, 1902 g (19 mol) of $CaCO_3$ in 20 l of water were made into a homogeneous suspension while stirring well. By means of a pump, this suspension was metered into a funnel-shaped reaction zone provided with an axially arranged high performance dispersing device which was operated according to the rotor-stator principle at a speed of 10 000 rev/min. A solution of 27.0 g (1 mol) of Al in 2305 g (20 mol) of $H_3PO_4$ (85% by weight) was metered into the reaction mixture by way of a nozzle over a period of 2 hours. The temperature was 20° C. Next, the reaction mixture was circulated by pumping for a further 30 minutes and was then suction filtered. Resulting precipitate was washed with water and acetone and dried in a drying cabinet for 1 hour at 70° C. A white pigment was obtained. X-ray analysis indicated, it was calcium hydrogen phosphate dihydrate. Its average particle size was less than 1 μm and its maximum particle size was 4 μm. The BET surface area of the product was 16 m²/g.

EXAMPLE 7 (Comparative Example)

The procedure was as in Example 6 except that 2305 g (20 mol) of 85% by weight $H_3PO_4$ was metered into 2002 g (20 mol) of $CaCO_3$ in 20 l of water. A calcium hydrogen phosphate dihydrate pigment was obtained. It had an average particle size of 4 μm and a maximum particle size of 12 μm. Its BET surface area was 2.7 m²/g.

EXAMPLE 8

The procedure was as in Example 6 except that the $CaCO_3$ was replaced by 766 g (19 mol) of MgO in 14 l of water. In this manner, a white pigment was obtained. By X-ray analysis, it was identified as magnesium hydrogen phosphate trihydrate (JCPDS card index No. 20-153 and 1-597). Its average particle size was 1 μm and its maximum particle size 5 μm. The BET surface area of the product was 14 m²/g.

EXAMPLE 9

The procedure was as in Example 6 except that the $CaCO_3$ was replaced by 2320 g (28.5 mol) of ZnO in 20 l of water. A white pigment was obtained. By X-ray analysis, it was identified as zinc phosphate tetrahydrate (JCPDS card index No. 9-497, 24-1461, 23-747). Its average particle size was less than 1 μm and its maximum particle size 4 μm. The BET surface area of the pigment was 61 m²/g.

EXAMPLE 10

A mixture of 84.5 g (0.5 mol) of $MnSO_4.H_2O$ in 200 ml of water and 1.35 g (0.05 mol) of Al in 25.4 g (0.22 mol) of 85% by weight $H_3PO_4$ was added dropwise within 2 hours, to a well stirred solution of 88.4 g (0.33 mol) of $Na_2HPO_4.7H_2O$ in 300 ml of water. During the reaction, the pH varied between 9 and 4. A pale pink pigment-fine precipitate was formed which was filtered off, washed with water and acetone and dried for 3 hours at 70° C. The pigment was identified by X-ray analysis as being $MnHPO_4.3H_2O$ (JCPDS card index No. 1-316 and 3-361). Its average particle size was 4 μm and its maximum particle size was 10 μm.

EXAMPLE 11 (Comparative Example)

The procedure was as in Example 10 except that 80.4 g (0.3 mol) of $Na_2HPO_4.7H_2O$ and 23.05 g (0.2 mol) of 85% by weight $H_3PO_4$ were used and no Al was added. $MnHPO_4.3H_2O$ with an average particle size of 17–18 μm and a maximum particle size of 60 μm was obtained.

EXAMPLE 12

115.3 g (1 mol) of 85% by weight $H_3PO_4$, in which 3.9 g (0.05 mol) of $Al(OH)_3$ had previously been dissolved, was metered into a well stirred solution of 360.4 g (0.95 mol) of $Pb(CH_3COO)_2.3H_2O$ in 600 ml of $H_2O$. The temperature during the reaction was 25° C., and the reaction time was 2 hours. The pH varied within a range of from 7 to 4. A white precipitate of lead hydrogen phosphate was formed which was suction-filtered, washed with water and acetone and dried in a drying cabinet for 3 hours at 70° C. The product was identified by X-ray analysis (X-ray Diffraction Patterns of Lead Compounds, Chester, England, 1954, pp. 54/55). The pigment had an average particle size of 2 μm and a maximum particle size of 5 μm.

EXAMPLE 13 (Comparative Example)

The procedure was as in Example 12 except that 115.3 g (1 mol) of 85% by weight $H_3PO_4$ was metered into a solution of 379.3 g (1 mol) of $Pb(CH_3COO)_2.3H_2O$ in 600 mol of $H_2O$, within 2 hours, without any Al being added. A lead hydrogen phosphate which had an average particle size of 10–11 μm and a maximum particle size 30 μm was obtained.

EXAMPLE 14

A solution of 1.35 g (0.05 mol) of Al in 126.2 g (1 mol) of 65% by weight $H_3PO_3$ was metered into a well stirred suspension of 77.3 g (0.95 mol) of ZnO in 400 ml of water, within 2 hours. During the reaction, the pH varied between 8 and 4. A white precipitate was formed which was separated from the solution by suction filtration, washed with water and acetone and dried in a drying cabinet for 3 hours at 70° C. A zinc phosphite pigment with an average particle size of 4 μm and a maximum particle size of 10 μm was obtained.

EXAMPLE 15 (Comparative Example)

The procedure was as in Example 14 except that 81.3 g (1 mol) of ZnO and 126.2 g (1 mol) of 65% by weight $H_3PO_3$ were used, no Al being added. Zinc phosphite with an average particle size of 15 μm and a maximum particle size of 28 μm was obtained.

EXAMPLE 16

While cooling with ice, 178.0 g (1 mol) of $H_4P_2O_7$ were stirred with 50 g of melting ice until a homogeneous solution had formed. 12.7 g (0.04 mol) of $Al(H_2PO_4)_3$ in the form of a 50% by weight aqueous solution were then added while stirring well. The ice-cold solution was then added, within 2 hours, to a well-stirred suspension of 79.0 g (1.96 mol) of MgO in 300 ml of water. The pH varied during the reaction within a range of from 9 to 5. Magnesium pyrophosphate octahydrate with an average particle size of 1 μm and a maximum particle size of 5 μm was formed.

EXAMPLE 17 (Comparative Example)

The procedure was as in Example 16. The pyrophosphoric acid, which was free from Al, was added dropwise to a suspension of 80.6 g (2 mol) of MgO in 300 ml of water. Magnesium pyrophosphate octahydrate with an average particle size of 5 μm and a maximum particle size of 15 μm was obtained.

We claim:

1. In a process for the manufacture of a finely dispersed, sparingly soluble divalent metal salt of an oxyacid of phosphorus, having a maximum particle size of 20 μm, by reacting a compound of a divalent metal with the oxyacid of phosphorus or an alkali metal or ammonium salt thereof, the improvement which comprises reacting an at least 5% by weight aqueous solution or suspension of a compound of a divalent metal selected from the group consisting of Mg, Ca, Sr, Ba, Mn, Zn, Cu, Cd, Pb, Sn, Co and Ni, while maintaining a pH range of between 3 and 9 and while stirring, with an at least 2 mol% solution of at least one trivalent metal selected from the group consisting of Al, Fe and Cr in the oxyacid of phosphorus or with an at least 2 mol% solution of at least one trivalent metal selected from the group consisting of Al, Fe and Cr in the oxyacid of phosphorus and an aqueous solution of an alkali metal or ammonium salt of the oxyacid of phosphorus, the compound of the divalent metal and that of the trivalent metal being used in the reaction mixture in a molar ratio of from 9:1 to 50:1, with the resultant formation of the finely dispersed divalent metal salt of the oxyacid of phosphorus, at least 90% of the particles of which salt have a size between 0.05 and 7 μm, and separating and drying the precipitated salt.

2. A process as claimed in claim 1, wherein the carbonate, oxide, acetate or hydroxide is used as the compound of a divalent metal.

3. A process as claimed in claim 2, wherein the aqueous solution or suspension of the compound of the divalent metal is prepared first and admixed, with agitation, with metered proportions of the solution of the trivalent metal in the oxyacid of phosphorus.

4. A process as claimed in claim 1, wherein an 8–30% by weight aqueous solution or suspension of the compound of the divalent metal is used.

5. A process as claimed in claim 1, wherein the reaction components are reacted by being intimately mixed in a dispersing vessel rotating at speeds of from 3,000 to 10,000 rev/min., with the resultant formation of the finely dispersed divalent metal salt of the oxyacid of phosphorus consisting to an extent of at least 90% of particles with a size between 0.05 and 2 μm.

6. A process as claimed in claim 1, wherein the compound of the divalent metal having an acid-reacting anion is used and the pH-range is maintained between 3 and 9 by simultaneously adding an alkaline compound which forms a water-soluble salt with the acid-reacting anion.

7. A process as claimed in claim 6, wherein an aqueous solution of an alkali metal or ammonium salt of the oxyacid of phosphorus is prepared first and used as the alkaline compound and then admixed with metered proportions of a mixture of an aqueous solution of the compound of the divalent metal and the solution of the trivalent metal in the free oxyacid of phosphorus, the stoichiometrically required amount of free oxyacid of phosphorus to be used being reduced by an amount equivalent to that of the alkali metal or ammonium salt first prepared.

* * * * *